US010184540B2

(12) United States Patent
Ogawa et al.

(10) Patent No.: US 10,184,540 B2
(45) Date of Patent: Jan. 22, 2019

(54) LIQUID PRESSURE DEVICE

(71) Applicant: KYB Corporation, Tokyo (JP)

(72) Inventors: Takayuki Ogawa, Tokyo (JP); Takuya Kouge, Tokyo (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 15/514,327

(22) PCT Filed: Oct. 22, 2015

(86) PCT No.: PCT/JP2015/079822
§ 371 (c)(1),
(2) Date: Mar. 24, 2017

(87) PCT Pub. No.: WO2016/063944
PCT Pub. Date: Apr. 28, 2016

(65) Prior Publication Data
US 2017/0276205 A1 Sep. 28, 2017

(30) Foreign Application Priority Data
Oct. 24, 2014 (JP) ................... 2014-216895

(51) Int. Cl.
F16F 9/32 (2006.01)
F16F 9/46 (2006.01)
(Continued)

(52) U.S. Cl.
CPC .............. F16F 9/32 (2013.01); F16F 9/18 (2013.01); F16F 9/185 (2013.01); F16F 9/46 (2013.01);
(Continued)

(58) Field of Classification Search
CPC ...... F16F 9/32; F16F 9/50; F16F 9/185; F16F 2228/066; B61F 5/245
(Continued)

(56) References Cited

U.S. PATENT DOCUMENTS 4,139,186 A * 2/1979 Postema ............... B60G 17/005
188/322.19
4,240,531 A * 12/1980 Postema ................. F16F 9/364
188/315
(Continued)

FOREIGN PATENT DOCUMENTS

JP S58-072744 A 4/1983
JP 04034237 A * 2/1992
(Continued)

Primary Examiner — Thomas J Williams
Assistant Examiner — Mariano Sy
(74) Attorney, Agent, or Firm — Paratus Law Group, PLLC

(57) ABSTRACT

Provided is a liquid pressure device having no dead band in generation of force and causing no contamination, the liquid pressure device including a bottom cap and a head cap welded to an outer tube, and a rod guide fastened to the head cap, and one end of a pipe is fit in the bottom cap and the other end of the pipe is fit in the rod guide, and the bottom cap and the rod guide sandwich a cylinder. Accordingly, the liquid pressure device of the present invention can add shaft force to the cylinder while supporting the pipe, an inside of which is isolated from a tank, by the bottom cap and the rod guide, and does not need to braze the pipe to the bottom cap. Therefore, the liquid pressure device of the present invention has no dead band in generation of force and causes no contamination.

18 Claims, 3 Drawing Sheets

(51) Int. Cl.
  *F16F 9/18* (2006.01)
  *F16F 9/50* (2006.01)
  *B61F 5/24* (2006.01)

(52) U.S. Cl.
  CPC ............... *F16F 9/50* (2013.01); *B61F 5/245* (2013.01); *F16F 2228/066* (2013.01)

(58) Field of Classification Search
  USPC .................................. 188/315, 313, 314
  See application file for complete search history.

(56) References Cited

U.S. PATENT DOCUMENTS

| | | | | |
|---|---|---|---|---|
| 4,744,444 | A | * | 5/1988 | Gillingham ............... F16F 9/44 |
| | | | | 137/523 |
| 5,618,248 | A | * | 4/1997 | Huang ............... A63B 21/0083 |
| | | | | 188/315 |
| 5,799,758 | A | * | 9/1998 | Huang ............... A63B 21/0083 |
| | | | | 188/285 |
| 5,924,528 | A | * | 7/1999 | Vermolen ................. F16F 9/46 |
| | | | | 188/266.1 |
| 9,193,365 | B2 | * | 11/2015 | Ogawa ..................... B61F 5/245 |
| 2004/0011613 | A1 | * | 1/2004 | Vance ..................... B61F 5/245 |
| | | | | 188/315 |
| 2004/0251097 | A1 | * | 12/2004 | Barbison ................ B60G 17/08 |
| | | | | 188/315 |
| 2013/0081912 | A1 | | 4/2013 | Murakami |
| 2014/0116826 | A1 | | 5/2014 | Ogawa et al. |

FOREIGN PATENT DOCUMENTS

| | | |
|---|---|---|
| JP | 2000-238637 | 9/2000 |
| JP | 2008-025694 | 2/2008 |
| JP | 2012-026564 | 2/2012 |
| JP | 2012-193824 | 10/2012 |
| JP | 2013-001306 | 1/2013 |
| JP | 2014-114871 A | 6/2014 |

* cited by examiner

LIQUID PRESSURE DEVICE

CROSS REFERENCE TO PRIOR APPLICATION

This application is a National Stage Patent Application of PCT International Patent Application No. PCT/JP2015/079822 (filed on Oct. 22, 2015) under 35 U.S.C. § 371, which claims priority to Japanese Patent Application No. 2014-216895 (filed on Oct. 24, 2014), which are all hereby incorporated by reference in their entirety.

TECHNICAL FIELD

The present invention relates to a liquid pressure device.

BACKGROUND ART

Conventionally, as liquid pressure devices of these kinds, a damper interposed between a vehicle body and a truck of a railway vehicle, and suppresses vibration of the vehicle body in a right and left direction with respect to a vehicle traveling direction is known, for example, as illustrated in JP 2000-238637 A.

To be specific, the damper includes a cylinder connected to one of the truck and the vehicle body of the railway vehicle, a piston inserted into the cylinder in a freely slidable manner, a rod inserted into the cylinder, and connected to the piston, and the other of the truck and the vehicle body, a rod-side chamber and a piston-side chamber divided in the cylinder with the piston, a tank, a first on-off valve provided in the middle of a first passage that allows the rod-side chamber and the piston-side chamber to communicate with each other, a second on-off valve provided in the middle of a second passage that allows the piston-side chamber and the tank to communicate with each other, a discharge passage connecting the rod-side chamber to the tank, and a variable relief valve provided in the middle of the discharge passage.

In the damper configured in this way, damping force generated at the time of expansion/contraction can be adjusted with the variable relief valve. Further, when the first on-off valve is opened and the second on-off valve is closed, the expansion-side chamber and the contraction-side chamber communicate with each other, hydraulic oil is not pushed from the cylinder to the discharge passage at the time of expansion, and the damper does not exert the damping force at the expansion side although the damper can exert the damping force at the contraction side.

Further, when the first on-off valve is closed and the second on-off valve is opened, the contraction-side chamber and the tank communicate with each other, the hydraulic oil is not pushed from the cylinder to the discharge passage at the time of contraction, and the damper cannot exert the damping force at the contraction side although the damper can exert the damping force at the expansion side. If the damper is configured in this way, the damper can be set to be so-called one-side effective by opening/closing of the first on-off valve and the second on-off valve, and the damper does not automatically generate the damping force in a region where skyhook control force is unable to be generated. Therefore, the vehicle body of the railway vehicle can be easily semi-actively controlled.

CITATION LIST

Patent Literature

Patent Literature 1: JP 2000-238637 A

SUMMARY OF THE INVENTION

Problems to be Solved by the Invention

The above-described damper typically employs a structure in which an outer tube that covers the cylinder is provided, and the tank is provided between the cylinder and the outer tube. Meanwhile, the damper is provided with the first passage, and needs to cause the expansion-side chamber to communicate with the contraction-side chamber without through the tank. Although the first passage may be able to be provided outside the outer tube, if so, the first passage is exposed outward. Therefore, a structure to accommodate the first passage in the tank is employed.

To be specific, as illustrated in FIG. 3, the damper includes a bottom cap 102 welded to one end of an outer tube 101 that covers a cylinder 100 to block the one end of the outer tube 101, a head cap 103 welded to the other end of the outer tube 101, and a rod guide 105 fastened to the head cap 103 with bolts and which guides movement of a rod 104, and the first passage is formed of a pipe 106 accommodated in the tank formed between the cylinder 100 and the outer tube 101.

The pipe 106 penetrates the head cap 103 and is stretched over the bottom cap 102 and the head cap 103. In reality, to assemble a damper configured in this way, first, the pipe 106 is brazed in a hole provided in the bottom cap 102, and then the cylinder 100 and the outer tube 101 are assembled to the bottom cap 102. Further, the head cap 103 is fit in the outer tube 101 while bringing the pipe 106 to pass through a hole provided in the head cap 103 such that an unreasonable load is not applied to the brazed pipe 106, and the head cap 103 is welded to the outer tube 101.

Further, the rod guide 105 is laminated on the head cap 103. At that time, the pipe 106 needs to pass through a hole provided in the rod guide 105. Therefore, similarly to the assembly of the head cap 103, the pipe 106 needs to be carefully assembled such that an unreasonable load is not applied to the pipe 106. If a load is applied to the pipe 106, a portion brazed to the bottom cap 102 is peeled off, and the tank and the pipe 106 communicate with each other and the damper becomes a defective product. Therefore, careful work is required. Since such work is required, the assembly work is extremely troublesome.

Further, the rod guide 105 is fit in an outer periphery in a right end in FIG. 3 of the cylinder 100, and holds the cylinder 100 with the bottom cap 102. However, the rod guide 105 can less easily add shaft force to the cylinder 100. This is because the structure to fix the pipe 106 to the bottom cap 102 by brazing is employed, and thus if a configuration to add the shaft force to the cylinder 100 with the rod guide 105 is employed, the shaft force acts on the pipe 106 and the brazed portion is peeled off, and the damper may become a defective product, depending on dimension errors of the pipe 106 and the cylinder 100. It is possible to realize addition of the shaft force to the cylinder 100 if the components are highly accurately machined according to determined dimensions. However, the cost becomes extremely high, and employment of such a method is difficult.

For such a reason, in the conventional damper, the shaft force cannot be added to the cylinder 100, and thus the cylinder 100 plays in a shaft direction inside the damper. Then, the cylinder 100 is also moved by friction when a piston 107 in the cylinder 100 is moved, and the expansion-side chamber and the contraction-side chamber are not contracted or expanded, and damping force cannot be exerted. Therefore, the conventional damper has a problem to cause a slight dead band where the force can be exerted only after the piston 107 is moved more than the play of the cylinder 100 in the shaft direction.

Further, the pipe 106 is brazed, and thus the brazing may become a cause of contamination in the damper.

Therefore, the present invention has been invented to improve the above-described defect, and an object thereof is to provide a liquid pressure device having no dead band in generation of force and causing no contamination.

Solutions to Problems

To achieve the above-described object, a liquid pressure device in problem solving means of the present invention includes a bottom cap and a head cap welded to an outer tube, and a rod guide fastened to the head cap, wherein one end of a pipe is fit in the bottom cap and the other end of the pipe is fit in the rod guide, and the bottom cap and the rod guide sandwich a cylinder. Therefore, the liquid pressure device of the present invention can add shaft force to the cylinder while supporting the pipe, an inside of which is isolated from a tank, by the bottom cap and the rod guide. Further, the liquid pressure device of the present invention does not need to braze the pipe to the bottom cap.

Effects of the Invention

According to the liquid pressure device of the present invention, the shaft force is added to the cylinder. Therefore, there is no dead band in generation of force and no contamination is caused.

DESCRIPTION OF EMBODIMENTS

Figure 1:
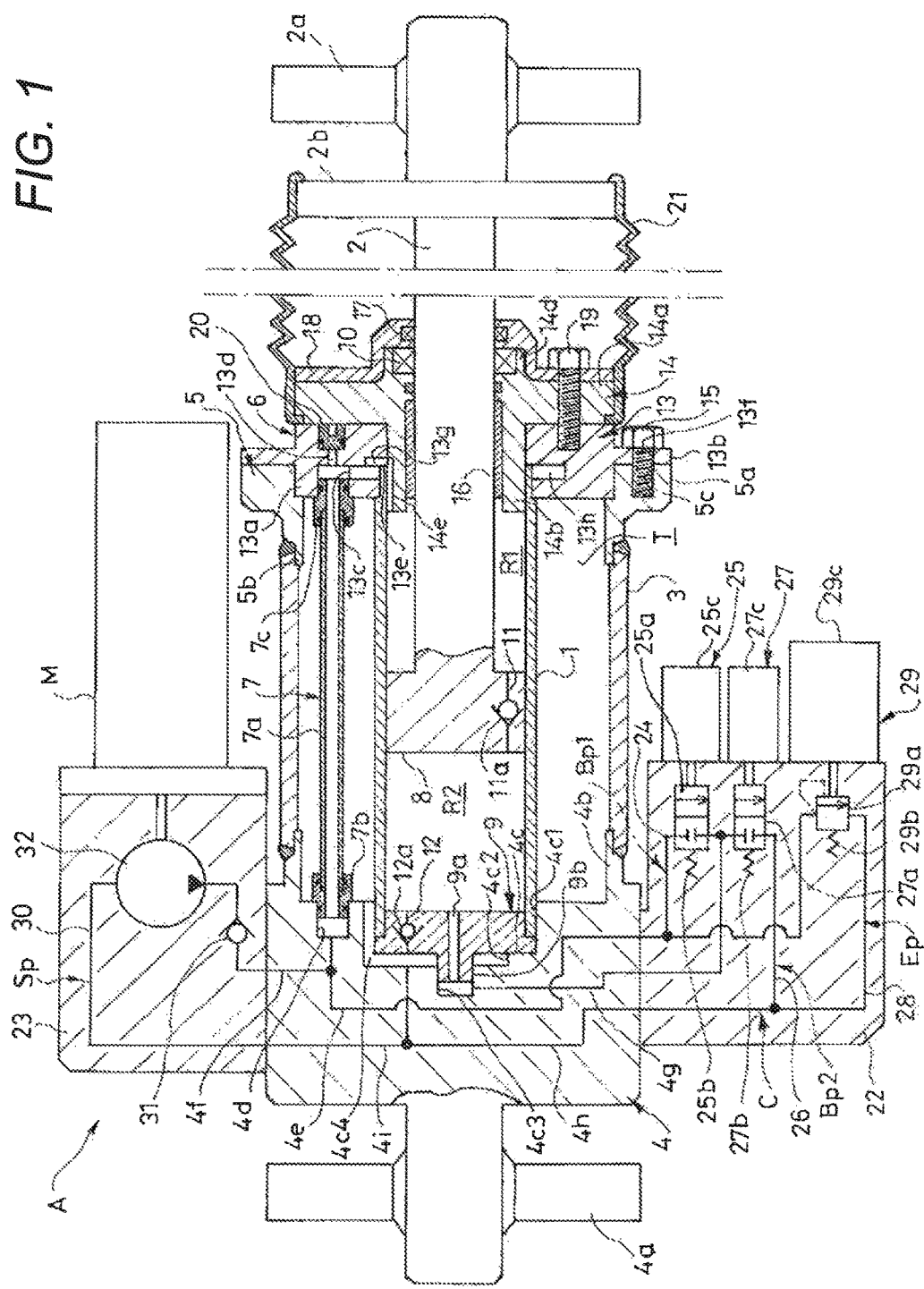
FIG. 1 is a vertical sectional view of an actuator as a liquid pressure device in an embodiment of the present invention.

Hereinafter, the present invention will be described on the basis of an embodiment illustrated in the drawings. The present embodiment is an actuator A that suppresses right and left movement of a vehicle body B of a railway vehicle, as illustrated in FIG. 1.

As illustrated in FIG. 1, the actuator A includes a cylinder 1, a rod 2 inserted into the cylinder 1 in a freely movable manner, an outer tube 3 that accommodates the cylinder 1 therein, a tank T formed between the cylinder 1 and the outer tube 3, a bottom cap 4 connected to a left end in FIG. 1, as one end of the outer tube 3, an annular head cap 5 connected to a right end in FIG. 1, as the other end of the outer tube 3, a rod guide 6 fastened to the head cap 5 and which guides movement of the rod 2 to be inserted into an inside, and a pipe 7 forming a passage accommodated in the tank T, sandwiched by the bottom cap 4 and the rod guide 6, and isolated from the tank T.

Figure 2:
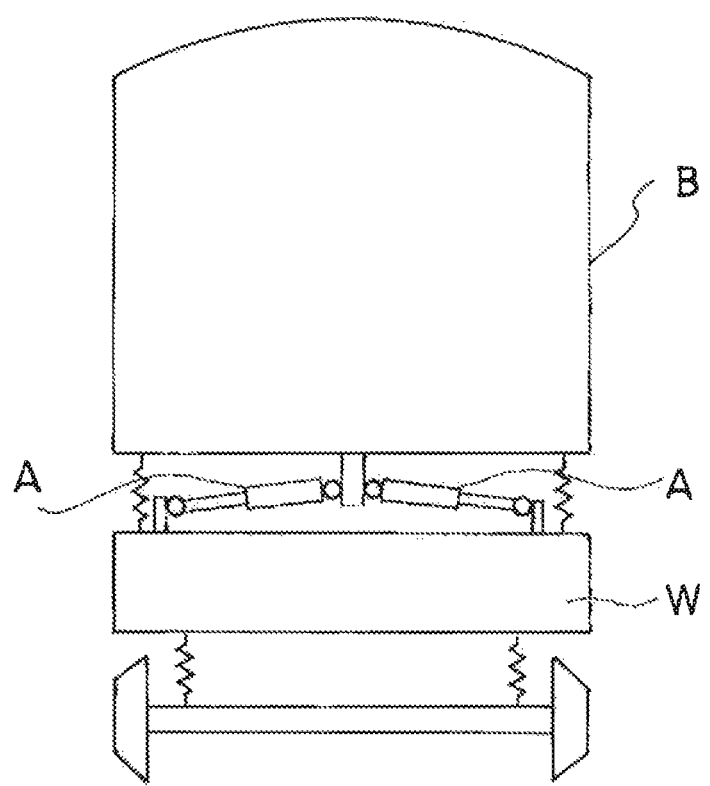
FIG. 2 is a diagram illustrating a state in which an actuator as a liquid pressure device of an embodiment of the present invention is applied to a railway vehicle.
Figure 3:
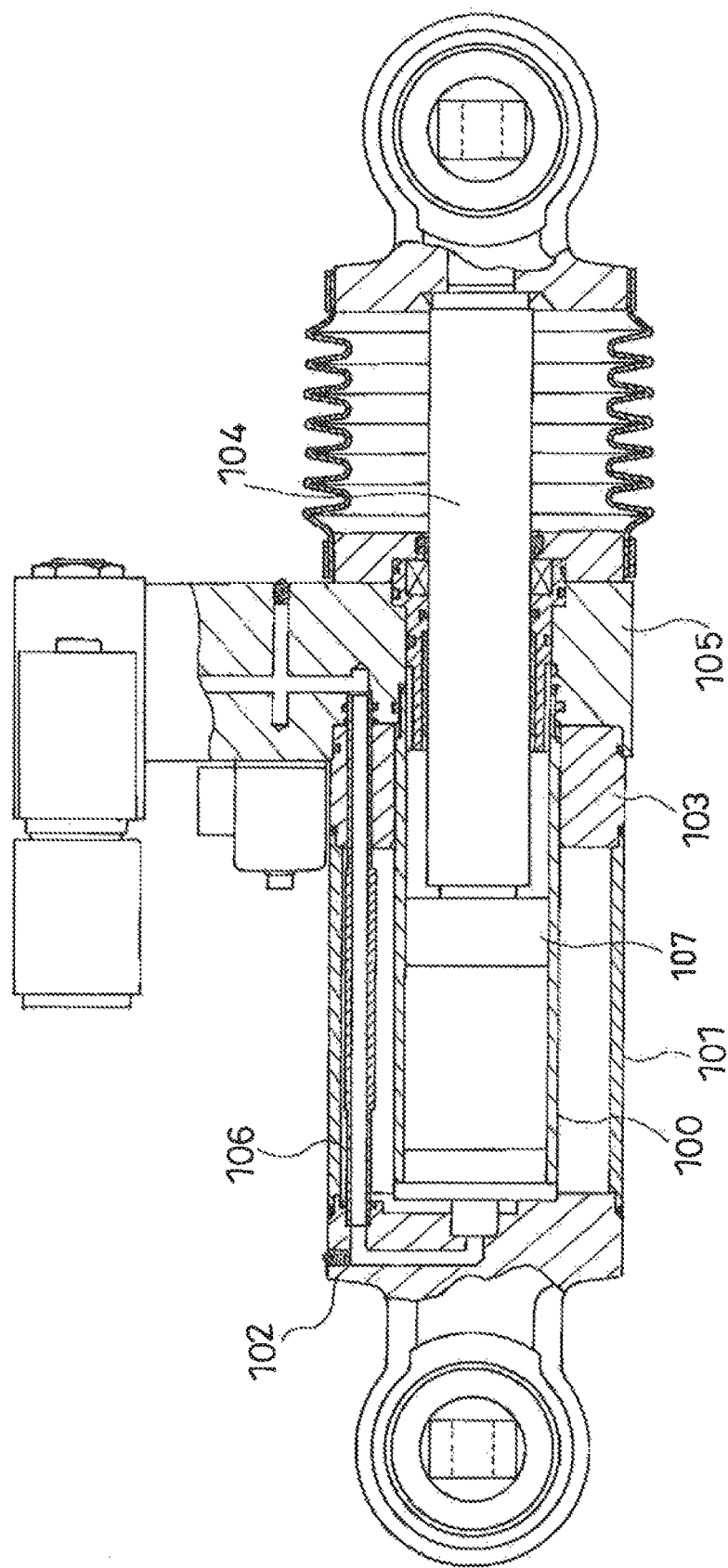
FIG. 3 is a vertical sectional view of a conventional liquid pressure device.

Further, the actuator A includes a liquid pressure circuit C communicating with an inside of the cylinder 1 with the pipe 7, and is expandable and contractable in a positive manner by supply of liquid pressure from a pump 32 provided in the liquid pressure circuit C. Then, as illustrated in FIG. 2, the actuator A is interposed between a truck W and the vehicle body B of the railway vehicle, and is used as a vibration control device of the vehicle body B to suppress vibration of the vehicle body B in a horizontal cross direction with respect to a vehicle traveling direction.

Hereinafter, units of the actuator A will be described in detail. The cylinder 1 has a cylindrical shape, and one end as a left end in FIG. 1 is blocked by a valve case 9 and the rod guide 6 is fit in the other end as a right end in FIG. 1. Further, the rod 2 inserted into the cylinder 1 in a freely movable manner is inserted into the rod guide 6 in a freely slidable manner. One end of the rod 2 protrudes outside the cylinder 1, and the other end in the cylinder 1 is connected to a piston 8, which is inserted into the cylinder 1 in a freely slidable manner, similarly to the rod 2.

Note that an outer periphery of the rod 2 is sealed with a seal member 10 attached to a right end in FIG. 1 of the rod guide 6, and an inside of the cylinder 1 is maintained in a sealed state. Further, the cylinder 1 is divided into an expansion-side chamber R1 on the right side in FIG. 1 and a contraction-side chamber R2 on the left side in FIG. 1 by the piston 8 inserted into the inside in a freely slidable manner. The expansion-side chamber R1 and the contraction-side chamber R2 are filled with a liquid such as hydraulic oil. As the liquid, liquids other than the hydraulic oil, such as water and an aqueous solution, can be used. A bracket 2a connectable with one of the truck W and the vehicle body B of the railway vehicle is provided to a right end in FIG. 1, as a tip end of the rod 2.

The piston 8 is provided with a piston passage 11 that allows the contraction-side chamber R2 and the expansion-side chamber R1 to communicate with each other, and includes a check valve 11a in the middle of the passage. The check valve 11a allows only a flow of the hydraulic oil from the contraction-side chamber R2 to the expansion-side chamber R1, and the piston passage 11 is set to a one-way passage.

As described above, the valve case 9 blocks the end portion of the cylinder 1, and includes a through hole 9a provided in the center, and a suction passage 12 that allows the tank T and the contraction-side chamber R2 to communicate with each other and includes a check valve 12a in the middle of the passage. A shaft portion 9b extending in a shaft direction is provided in a left-end center of the valve case 9, and the through hole 9a is opened from a tip end of the shaft portion 9b and leads to a right end of the valve case 9. The suction passage 12 leads from a left end of the valve case 9 and a position avoiding the shaft portion 9b to the right end. Further, the check valve 12a allows only a flow of the hydraulic oil from the tank T to the contraction-side chamber R2, and the suction passage 12 is set to a one-way passage.

The bottom cap 4 is attached to one end as a left end in FIG. 1 of the outer tube 3 by welding, and blocks the one end of the outer tube 3. The bottom cap 4 includes a bracket 4a provided to a left end in FIG. 1 and connectable with the other of the truck W and the vehicle body B of the railway vehicle, a tubular fitting portion 4b provided in a right end in FIG. 1 and fit in the outer tube 3, a recess portion 4c into which the left end of the cylinder 1 and the valve case 9 are fit, and a fitting hole 4d open to a right end in FIG. 1 and to an outer periphery side with respect to the recess portion 4c, and into which the pipe 7 is insertable.

Further, first and second circuit blocks 22 and 23 including the liquid pressure circuit C are connected to side portions of the bottom cap 4, and communication passages 4e, 4f, 4g, 4h, and 4i that allow the inside of the cylinder 1 and the tank T to communicate with the liquid pressure circuit C are provided in the bottom cap 4.

When the fitting portion 4b of the bottom cap 4 configured as described above is fit into the left end of the outer tube 3, a groove is formed between the fitting portion 4b and the left end of the outer tube 3, and the fitting portion 4b and the outer tube 3 are welded and integrated using the groove. The recess portion 4c includes a large-diameter portion 4c1 having a larger inner diameter than outer diameters of the valve case 9 and the cylinder 1, an intermediate-diameter portion 4c2 continuing into a left end of the large-diameter portion 4c1 and having a smaller inner diameter than the large-diameter portion 4c1, and a small-diameter portion 4c3 continuing into a left end of the intermediate-diameter portion 4c2 and having a smaller inner diameter than the intermediate-diameter portion 4c2. When an end of the cylinder 1 in which the valve case 9 is fit is inserted into the recess portion 4c, the shaft portion 9b of the valve case 9 is inserted into the small-diameter portion 4c3, and the cylinder 1 and the valve case 9 are positioned in a radial direction. Further, the intermediate-diameter portion 4c2 has a smaller diameter than the outer diameter of the valve case 9, and when the cylinder 1 and the valve case 9 are inserted into the large-diameter portion 4c1, the valve case 9 sits on a step portion between the large-diameter portion 4c1 and the intermediate-diameter portion 4c2, and a cavity is caused on the left side of the valve case 9. An annular gap leading to the tank T is formed between the large-diameter portion 4c1, and the cylinder 1 and the valve case 9, and the annular gap leads to the cavity through a groove 4c4 provided in the step portion between the large-diameter portion 4c1 and the intermediate-diameter portion 4c2. This cavity faces the suction passage 12 provided in the valve case 9, and the suction passage 12 communicates with the tank T through the annular gap and the cavity, and communication between the contraction-side chamber R2 and the tank T is secured. Note that the tank T is filled with a gas in addition to the hydraulic oil. It is not especially necessary to fill the tank T with a compressed gas to cause a pressurized state.

The communication passages 4e and 4f are open from a side of the bottom cap 4 and communicate with an inside of the pipe 7 through the fitting hole 4d. The communication passage 4g is open form the side of the bottom cap 4 and leads to the small-diameter portion 4c3. The valve case 9 includes the shaft portion 9b to be inserted into the small-diameter portion 4c3, and the through hole 9a is open from the shaft portion 9b and leads to the contraction-side chamber R2. Therefore, the communication passage 4g leads to the contraction-side chamber R2 through the small-diameter portion 4c3 and the through hole 9a. The communication passages 4h and 4i are also open from the side of the bottom cap 4 and communicate with the tank T.

The head cap 5 is attached to the other end as a right end in FIG. 1 of the outer tube 3 by welding. The head cap 5 includes an annular flange portion 5a having a larger outer diameter than the outer diameter of the outer tube 3, a fitting portion 5b extending from a left-end inner periphery of the flange portion 5a toward the outer tube 3 side, and fit in the outer tube 3, and a plurality of screw holes 5c open from a right end of the flange portion 5a. When the fitting portion 5b of the head cap 5 configured in this way is fit in the right end of the outer tube 3, a groove is formed between the fitting portion 5b and the right end of the outer tube 3, and the fitting portion 5b and the outer tube 3 are welded and integrated using the groove.

The rod guide 6 includes, in the present embodiment, a pipe holding member 13 fastened to the head cap 5 with bolts, and a guide member 14 fastened to and integrated with the pipe holding member 13 with bolts.

The pipe holding member 13 includes a thick tubular pipe holding tube 13a fit in an inner periphery of the head cap 5, a flange 13b provided in an outer periphery of the pipe holding tube 13a, a fitting hole 13c open from a tank-side end as a right end in FIG. 1 of the pipe holding tube 13a, and into which the pipe 7 is insertable, a leading hole 13d open from a side end opposite to the tank T, as a right end in FIG. 1 of the pipe holding tube 13a, and coaxially leading to the fitting hole 13c, and a cylinder pressing portion 13e as an inner periphery of the pipe holding tube 13a, and formed to have a small diameter on the cylinder side to provide a step portion.

Further, bolt insertion holes 13f of the same number as the screw holes 5c provided in the head cap 5 are provided in the flange 13b. When the pipe holding tube 13a is inserted into the head cap 5, and the flange 13b is laminated on the flange portion 5a of the head cap 5, the bolt insertion holes 13f face the screw holes 5c. In this state, when bolts 15 are screwed into the screw holes 5c through the bolt insertion holes 13f, the pipe holding member 13 is fastened to and integrated with the head cap 5 with the bolts.

Inner and outer diameters of the cylinder pressing portion 13e of the pipe holding member 13 are equal to those of the cylinder 1. When the pipe holding member 13 is fastened to the head cap 5 with the bolts, the cylinder pressing portion 13e comes in contact with the other end as a right end in FIG. 1 of the cylinder 1. As described above, the one end of the cylinder 1 is supported by the bottom cap 4, and thus the cylinder 1 is sandwiched by the pipe holding member 13 and the bottom cap 4. When the pipe holding member 13 is being fastened to the head cap 5 with the bolts 15, the cylinder 1 is pressed toward the bottom cap 4 side by the cylinder pressing portion 13e, and shaft force can be added to the cylinder 1.

Further, the pipe 7 is stretched over the pipe holding member 13 and the bottom cap 4. To be specific, when one end as a left end in FIG. 1 of the pipe 7 is inserted into and fit in the fitting hole 4d of the bottom cap 4, and the other end as a right end in FIG. 1 of the pipe 7 is inserted into and fit in the fitting hole 13c provided in the pipe holding member 13, the pipe 7 is supported by the pipe holding member 13 and the bottom cap 4, and can be attached without adding the shaft force to the pipe holding member 13 and the bottom cap 4. In the present embodiment, the pipe 7 is configured from a pipe main body 7a, and tubular sockets 7b and 7c fit in both ends of the pipe main body 7a and having respective tip ends formed to have a small diameter and fit in the fitting holes 4d and 13c, respectively. Both of the sockets 7b and 7c include a seal ring provided on an inner periphery and closely adhering to an outer periphery of the pipe main body 7a, and a seal ring provided on an outer periphery and closely adhering to inner walls of the fitting holes 4d and 13c, and the passage formed inside the pipe 7 is maintained in a fluid-tight manner and is isolated from the tank T. Note that the pipe 7 is configured from three parts including the pipe main body 7a and the sockets 7b and 7c. However, the pipe 7 may be configured from a single part. The tips of the sockets 7b and 7c have a small diameter, and step portions are provided in the outer periphery. Further, portions of the sockets 7b and 7c, into which the pipe main body 7a is inserted, have a large diameter, and step portions are also formed in the inner periphery. Therefore, even if the pipe 7 is moved in the shaft direction with respect to the pipe holding member 13 and the bottom cap 4, the sockets 7b and 7c do not fall off of the fitting holes 4d and 13c, and even if the pipe main body 7a is moved in the shaft direction with respect to the sockets 7b and 7c, the pipe main body 7a does not fall off of the sockets 7b and 7c. If the sockets 7b and 7c are provided in this way, dropout of the pipe 7 from the fitting hole 13c of the pipe holding member 13 and the fitting hole 4d of the bottom cap 4 can be prevented. In a case of configuring the pipe 7 from a single part, both the ends of the pipe 7 may be caused to have a small diameter and the step portions may be provided. However, the outer diameter of the entire pipe 7 becomes large, and the actuator A becomes heavy. To avoid this, unnecessary thickness of a middle of the pipe 7 may be decreased by cutting work. However, if so, the working cost becomes high and the material yield is decreased. In the case of providing the sockets 7b and 7c, such a disadvantage is not caused. However, this does not deny the pipe 7 configured from a single part.

The guide member 14 includes an annular main body portion 14a fastened to the pipe holding tube 13a of the pipe holding member 13 with bolts, a socket 14b provided to a left end in FIG. 1 of the main body portion 14a, inserted into the pipe holding member 13, and fit in the inner periphery of the cylinder 1 to position the cylinder 1 in the radial direction, and an annular bush 16 that supports the outer periphery of the rod 2 attached from the socket 14b to an inner periphery of the main body portion 14a.

Further, an annular protrusion 14d is provided to a left end in FIG. 1 of the main body portion 14a, and the seal member 10 that is in sliding contact with the outer periphery of the rod 2 and seals the outer periphery of the rod 2 is attached to the annular protrusion 14d. Further, a seal holding member 18 that holds an outer seal 17 that is in sliding contact with the outer periphery of the rod 2 and seals the outer periphery of the rod 2 is laminated on the main body portion 14a. The seal holding member 18 is fastened to the pipe holding member 13 together with the guide member 14 with a bolt 19.

An outer periphery of the main body portion 14a is designed to have a diameter that is equal to or less than the outer diameter of the pipe holding tube 13a so as not to interrupt fastening work of the bolts 15 inserted into the flange 13b of the pipe holding member 13.

The socket 14b has an outer diameter fittable to the pipe holding tube 13a of the pipe holding member 13 and the cylinder 1. When the socket 14b is fit in the cylinder 1, the socket 14b positions the right end in FIG. 1 of the cylinder 1 in the radial direction. Since the cylinder 1 is positioned in the radial direction in this way, a shaft center of the cylinder 1 is not shifted when the shaft force is added to the cylinder 1 with the pipe holding member 13. The tubular bush 16 is attached from an inner periphery of the socket 14b to an inner periphery of the main body portion 14a. Since the socket 14b is provided in this way, the length of the main body portion 14a in the shaft direction can be made short, and the entire length of the actuator A excluding the rod 2 can be made short, in addition to the function to position the cylinder 1 in the radial direction.

Further, a notch 14e is provided in a part of an outer periphery of the socket 14b, and communicates with an annular groove 13h provided in an inner periphery of the pipe holding member 13 through a groove 13g provided in the cylinder pressing portion 13e. Further, the annular groove 13h leads to the fitting hole 13c in which the pipe 7 is fit. Therefore, the inside of the pipe 7 communicates with the expansion-side chamber R1 through the annular groove 13h, the groove 13g, and the notch 14e. Further, one end side of the pipe 7 communicates with the liquid pressure circuit C provided inside the circuit blocks 22 and 23 through the communication passages 4e and 4f provided in the bottom cap 4.

Further, when the guide member 14 is fastened to the pipe holding member 13 with bolts, the leading hole 13d leading to the fitting hole 13c is blocked with the main body portion 14a. The leading hole 13d is provided to facilitate work to assemble the pipe holding member 13. A rod sufficiently longer than the pipe 7 and insertable into the leading hole 13d is inserted into the pipe 7, and the pipe holding member 13 is laminated on the head cap 5 such that the rod is inserted into the leading hole 13d. In doing so, in assembly work of the pipe holding member 13, the pipe 7 can be fit in the fitting hole 13c if the rod is inserted into the leading hole 13d although the pipe 7 cannot be recognized, and the assembly work becomes easy. The rod may just be pulled out after the pipe holding member 13 is assembled to the head cap 5. A plug 20 is inserted into the leading hole 13d from which the rod has been pulled out, the pipe 7 is maintained in a liquid-tight manner, and the leading hole 13d is blocked by the guide member 14. Therefore, dropout of the plug 20 is prevented.

The guide member 14 has a smaller outer diameter than the pipe holding member 13, and forms a small-diameter portion in the rod guide 6. The pipe holding member 13 forms a large-diameter portion in the rod guide 6. The rod guide 6 is configured from two parts including the pipe holding member 13 and the guide member 14. However, the rod guide 6 may be configured from one part in which the pipe holding member 13 and the guide member 14 are integrally formed. In the rod guide 6, the pipe holding member 13 serves a function to add the shaft force to the cylinder 1, and is thus favorably manufactured from iron-based material. However, the guide member 14 does not require the same strength as the pipe holding member 13. Therefore, if the guide member 14 is manufactured from light material such as aluminum and the rod guide 6 is configured from two parts of the pipe holding member 13 and the guide member 14, the rod guide 6 becomes lighter than the case where the rod guide 6 is manufactured from the iron-based material as one part.

After the rod guide 6 configured in this way is attached to the head cap 5, a dust boot 21 is attached to an outer periphery of the guide member 14 that forms the small-diameter portion in the rod guide 6, and an outer periphery of an annular boot holding portion 2b provided to a tip end of the rod 2. The dust boot 21 covers the outer periphery of the rod 2 to protect a sliding surface of the rod 2 with respect to the rod guide 6.

The first circuit block 22 includes a passage 24 having one end connected to the communication passage 4e and the other end communicating with the communication passage 4g, a first on-off valve 25 provided in the middle of the passage 24, a passage 26 having one end communicating with the communication passage 4h in the middle of the passage 24 and between the first on-off valve 25 and the communication passage 4g, a second on-off valve 27 provided in the middle of the passage 26, a passage 28 branching from the passage 24 and connected to the passage 26, and a variable relief valve 29 provided to the passage 28.

The one end of the passage 24 leads to the inside of the pipe 7 through the communication passage 4e, and further communicates with the expansion-side chamber R1. The other end of the passage 24 communicates with the contraction-side chamber R2 through the communication passage 4g. Therefore, the passage 24 and the communication passages 4e and 4g configure a first bypass path Bp1 communicating with the contraction-side chamber R2 and communicating with the expansion-side chamber R1 through the pipe 7.

The one end of the passage 26 leads to the contraction-side chamber R2 through the communication passage 4g, and the other end leads to the tank T through the communication passage 4h. Therefore, the passage 26 and the communication passages 4g and 4h configure a second bypass path Bp2 that allows the contraction-side chamber R2 and the tank T to communicate with each other.

The passage 28 communicates with the expansion-side chamber R1 through the communication passage 4e and the pipe 7, and communicates with the tank T through the communication passage 4h. Therefore, the passage 28 and the communication passages 4e and 4h configure a discharge passage Ep communicating with the tank T and communicating with the expansion-side chamber R1 through the pipe 7.

In the case of this embodiment, the first on-off valve 25 is an electromagnetic on-off valve, and includes a valve 25a having a communication position where the first bypass path Bp1 is open, and the expansion-side chamber R1 and the contraction-side chamber R2 communicate with each other, and a cutoff position where the communication between the expansion-side chamber R1 and the contraction-side chamber R2 is cut off, a spring 25b that biases the valve to take the cutoff position, and a solenoid 25c that switches the valve 25a to the communication position against the spring 25b at the time of energization.

In the case of this embodiment, the second on-off valve 27 is an electromagnetic on-off valve, and includes a valve 27a having a communication position where the second bypass path Bp2 is open, and the contraction-side chamber R2 and the tank T communicate with each other, and a cutoff position where the communication between the contraction-side chamber R2 and the tank T is cutoff, a spring 27b that biases the valve 27a to take the cutoff position, and a solenoid 27c that switches the valve 27a to the communication position against the spring 27b at the time of energization.

In the present embodiment, the variable relief valve 29 is a proportional electromagnetic relief valve, and includes a valve body 29a provided in the middle of the discharge passage Ep, a spring 29b that biases the valve body 29a to cut off the discharge passage Ep, and a proportional solenoid 29c that generates thrust against the spring 29b at the time of energization. When a current amount flowing in the proportional solenoid 29c is adjusted, valve opening pressure can be adjusted.

When the pressure in the expansion-side chamber R1 upstream of the discharge passage Ep, the pressure being to act on the valve body 29a, exceeds relief pressure (valve opening pressure), resultant force of thrust caused by the pressure that presses the valve body 29a in a direction to open the discharge passage Ep and thrust by the proportional solenoid 29c gets over the biasing force of the spring 29b that biases the valve body 29a in a direction to cut off the discharge passage Ep, and the variable relief valve 29 causes the valve body 29a to move backward to open the discharge passage Ep. Note that the variable relief valve 29 is maintained in a closed state on a constant basis against a flow of the hydraulic oil in a direction from the tank T side toward the expansion-side chamber R1, and prevents the flow.

Further, in the variable relief valve 29, the thrust generated by the proportional solenoid 29c can be increased when the current amount to be supplied to the proportional solenoid 29c is increased. The valve opening pressure is minimized when the current amount to be supplied to the proportional solenoid 29c is maximized, while on the other hand, the valve opening pressure is maximized when the current is not supplied to the proportional solenoid 29c at all.

Meanwhile, the second circuit block 23 includes a passage 30 having one end connected to the communication passage 4f and the other end communicating with the communication passage 4i, and a check valve 31 and the pump 32 provided in the middle of the passage 30.

The one end of the passage 30 leads to the pipe 7 through the communication passage 4f, and further communicates with the expansion-side chamber R1. The other end of the passage 30 communicates with the tank T through the communication passage 4i. Therefore, the passage 30 and the communication passages 4f and 4i configures a liquid pressure supply passage Sp communicating with the tank T and communicating with the expansion-side chamber R1 through the pipe 7.

The pump 32 is driven by a motor M attached to the second circuit block 23. The pump 32 is a pump that discharges the hydraulic oil only in one direction, and its discharge port communicates with the expansion-side chamber R1 by the liquid pressure supply passage Sp, and its suction port leads to the tank T, and sucks the hydraulic oil from the tank T and supplies the hydraulic oil to the expansion-side chamber R1 when driven by the motor M.

As described above, the pump 32 discharges the hydraulic oil only in one direction, and does not perform a switching operation in a rotating direction. Therefore, there is no problem of change of a discharge amount at the time of switching rotation, and an inexpensive gear pump or the like can be used. Further, the rotating direction of the pump 32 is the same direction on a constant basis. Therefore, high responsiveness to rotation switching is not required in the motor M as a driving source to drive the pump 32, and thus an inexpensive motor M can be used. Note that the check valve 31 that prevents a backward flow of the hydraulic oil from the expansion-side chamber R1 to the pump 32 is provided in the middle of the passage 30 that configures apart of the liquid pressure supply passage Sp. Since the check valve 31 is provided, the backward flow of the hydraulic oil to the pump 32 is prevented, and the actuator A can exert large force without the constraints of maximum torque of the motor M in exerting force in a reverse direction to an operation direction.

In the actuator A configured in this way, when the first on-off valve 25 is set to the communication position and the second on-off valve 27 is set to the cutoff position while the hydraulic oil is supplied from the pump 32 to the expansion-side chamber R1 at a predetermined discharge flow rate, the expansion-side chamber R1 and the contraction-side chamber R2 communicate with each other, and the hydraulic oil is supplied from the pump 32 to both the chambers. With the supply of the hydraulic oil, a total sum of volumes of the expansion-side chamber R1 and the contraction-side chamber R2 is increased, the rod 2 is pushed from the cylinder 1 to the right side in FIG. 1, and the actuator A exhibits expansion operation. When the pressure in the expansion-side chamber R1 and in the contraction-side chamber R2 exceeds the valve opening pressure of the variable relief valve 29, the variable relief valve 29 is open and the hydraulic oil is discharged to the tank T through the discharge passage Ep. Therefore, the pressure in the expansion-side chamber R1 and in the contraction-side chamber R2 is controlled to the valve opening pressure of the variable relief valve 29 determined by the current amount provided to the variable relief valve 29. Then, the actuator A exerts thrust in an expansion direction, which is equal to a value obtained by multiplying a difference in pressure-receiving area between the contraction-side chamber R2 and the expansion-side chamber R1 in the piston 8 by the pressure in the expansion-side chamber R1 and in the contraction-side chamber R2 controlled by the variable relief valve 29.

When the first on-off valve 25 is set to the cutoff position and the second on-off valve 27 is set to the communication position while the hydraulic oil is supplied from the pump 32 to the expansion-side chamber R1 at a predetermined discharge flow rate, the hydraulic of is supplied to only the expansion-side chamber R1 and the expansion-side chamber R1 is expanded while the hydraulic oil is discharged from the contracted contraction-side chamber R2 to the tank T through the second on-off valve 27. Then, the piston 8 is pressed to the left side in FIG. 1, and the actuator A exhibits contraction operation. In this case, the pressure in the contraction-side chamber R2 becomes tank pressure and becomes constant, and the pressure in the expansion-side chamber R1 is controlled to the valve opening pressure of the variable relief valve 29. Then, similarly to the above description, by adjustment of the current amount of the variable relief valve 29, the actuator A exerts thrust in a contraction direction, which is equal to a value obtained by multiplying the pressure-receiving area of the expansion-side chamber R1 in the piston 8 by the pressure in the expansion-side chamber R1 controlled by the variable relief valve 29.

In a case of not providing the variable relief valve 29, the thrust generated by the actuator A can be adjusted by opening/closing the second on-off valve 27 while opening the first on-off valve 25 to adjust the pressure in the expansion-side chamber R1 in the expansion operation, and by opening/closing the first on-off valve 25 while opening the second on-off valve 27 to adjust the pressure in the rod-side chamber 5 in the contraction operation. In contrast, in a case of providing the discharge passage Ep and the variable relief valve 29, in expansion/contraction operation of the actuator A, the pressure in the expansion-side chamber R1 is adjusted to the valve opening pressure of the variable relief valve 29, and the pressure in the expansion-side chamber R1 can be easily controlled by adjustment of the valve opening pressure of the variable relief valve 29. If the discharge passage Ep and the variable relief valve 29 are provided in this way, sensors necessary to adjust the thrust of the actuator A becomes unnecessary. Further, since the pressure in the expansion-side chamber R1 may just be controlled by the variable relief valve 29, the motor M may just drive the pump 32 at a constant number of rotation, and it is not necessary to highly accurately control the motor M to adjust the discharge flow rate of the pump 32. Further, it is also not necessary to open/close the first on-off valve 25 and the second on-off valve 27 at a high speed to control the thrust of the actuator A, and also not necessary to control the thrust, using the first on-off valve 25 and the second on-off valve 27 as variable relief valves with an opening/closing function. Therefore, the actuator A as a liquid pressure device becomes inexpensive, and a robust system in hardware and in software can be constructed.

Further, in the case of this actuator A, the sectional-area of the rod 2 is half of the sectional-area of the piston 8, so that the pressure-receiving area of the expansion-side chamber R1 becomes half of the pressure-receiving area of the contraction-side chamber R2 of the piston 8, and the hydraulic oil amount with respect to a displacement amount of the actuator A is the same both in the expansion operation and the contraction operation. Therefore, if the valve opening pressure of the variable relief valve 29 is made the same and the pressure in the expansion-side chamber R1 is made the same both in the expansion operation and in the contraction operation, the thrust generated both in the expansion and in the contraction becomes equal.

To be specific, in a case of causing the actuator A to perform the expansion operation, the expansion-side chamber R1 and the contraction-side chamber R2 communicate with each other and thus the pressure in the expansion-side chamber R1 and the pressure in the contraction-side chamber R2 becomes equal, and the actuator A generates the thrust obtained by multiplying the difference in pressure-receiving area between the expansion-side chamber R1 and the contraction-side chamber R2 in the piston 8 by the pressure. On the other hand, in a case of causing the actuator A to perform the contraction operation, the communication between the expansion-side chamber R1 and the contraction-side chamber R2 is cut off and the contraction-side chamber R2 communicates with the tank T, and thus the actuator A generates the thrust obtained by multiplying the pressure in the expansion-side chamber R1 by the pressure-receiving area of the expansion-side chamber R1 in the piston 8. The thrust generated by the actuator A becomes a value obtained by multiplying half of the sectional-area of the piston 8 by the pressure in the expansion-side chamber R1 both in the expansion and in the contraction. Therefore, in a case of controlling the thrust of the actuator A, the pressure in the expansion-side chamber R1 may just be controlled both in the expansion operation and in the contraction operation. The pressure-receiving area of the expansion-side chamber R1 of the piston 8 is set to half of the pressure-receiving area of the contraction-side chamber R2, and the pressure in the expansion-side chamber R1 becomes the same in the expansion side and in the contraction side when the same thrust is generated both in the expansion side and in the contraction side, and thus the control becomes simple. In addition, the hydraulic oil amount with respect to the displacement amount becomes the same. Therefore, there is an advantage that the responsiveness becomes the same both in the expansion side and in the contraction side. Note that, even in a case where the pressure-receiving area of the expansion-side chamber R1 of the piston 8 is not set to be half of the pressure-receiving area of the contraction-side chamber R2, the point that the thrust of the actuator A of both the expansion and the contraction can be controlled by the pressure in the expansion-side chamber R1 is not changed.

Next, an operation of a case in which the actuator A functions as a passive damper will be described. When both the first on-off valve 25 and the second on-off valve 27 in the actuator A take the cutoff position, the piston passage 11, the suction passage 12, and the discharge passage Ep tie the expansion-side chamber R1, the contraction-side chamber R2, and the tank T to communicate in a row. Then, the piston passage 11, the suction passage 12, and the discharge passage Ep are set to a one-way passage. Therefore, if the actuator A is expanded/contracted by external force, the hydraulic oil is necessarily discharged from the cylinder 1 and is returned to the tank T through the discharge passage Ep, and the hydraulic oil insufficient in the cylinder 1 is supplied from the tank T to the cylinder 1 through the suction passage 12. The variable relief valve 29 becomes resistance against the flow of the hydraulic oil and functions as a pressure control valve to adjust the pressure in the cylinder 1 to the valve opening pressure. Therefore, the actuator A can function as a passive uniflow damper. Further, at the time of failure where energization to the devices of the actuator A becomes disabled, the valves 25a and 27a of the first on-off valve 25 and the second on-off valve 27 are pressed by the springs 25b and 27b, and take the cutoff position. Then, the variable relief valve 29 functions as a pressure control valve where the valve opening pressure is fixed to the maximum. Therefore, the actuator A automatically functions as a passive damper.

As described above, the actuator A can function as not only an actuator but also a damper regardless of a driving state of the motor M, and does not involve a troublesome and steep switching operation of the valves. Therefore, a highly responsive and reliable system can be provided.

Note that the actuator A is set to a single rod actuator, and thus a stroke length can be more easily secured than a double rod actuator, and the entire length of the actuator becomes short and mountability to the railway vehicle is improved.

Further, the supply of the hydraulic oil from the pump 32 and the flow of the hydraulic oil by the expansion/contraction operation in the actuator A pass the expansion-side chamber R1 and the contraction-side chamber R2 in order and are finally returned to the tank T. Even if a gas is mixed in the expansion-side chamber R1 or the contraction-side chamber R2, the gas is autonomously discharged to the tank T by the expansion/contraction operation of the actuator A. Therefore, the actuator A can prevent deterioration of responsiveness of generation of thrust.

If a proportional electromagnetic relief valve that can proportionally change the valve opening pressure with a given current amount is used as the variable relief valve 29, control of the valve opening pressure is simple. However, the variable relief valve 29 is not limited to the proportional electromagnetic relief valve as long as the variable relief valve 29 is a relief valve that can adjust the valve opening pressure.

Note that the piston passage 11 can be put into the first bypass passage Bp1 where the cutoff position of the first on-off valve 25 is the check valve, and the suction passage 12 can be put into the second bypass passage Bp2 where the cutoff position of the second on-off valve 27 is the check valve.

The actuator A as a liquid pressure device of the present invention is configured as described above. According to the liquid pressure device of the present invention, the bottom cap 4 and the head cap 5 welded to the outer tube 3, and the rod guide 6 fastened to the head cap 5 are included, and the one end of the pipe 7 is fit in the bottom cap 4 and the other end of the pipe 7 is fit in the rod guide 6 and the cylinder 1 is sandwiched by the bottom cap 4 and the rod guide 6. Therefore, the shaft force can be added to the cylinder 1 while the pipe 7, an inside of which is isolated from the tank T, is supported by the bottom cap 4 and the rod guide 6. Further, in the liquid pressure device of the present invention, it is not necessary to braze the pipe 7 to the bottom cap 4. Therefore, contamination does not occur, and the assembly work becomes extremely simple and the liquid pressure device cannot be a defective product. Further, in the liquid pressure device of the present invention, the shaft force is added to the cylinder 1. Therefore, there is no dead band where the damping force or the thrust at the time of expansion/contraction cannot be generated. According to the liquid pressure device of the present invention, there is no dead band in generation of force and no contamination is caused.

Further, in the liquid pressure device of the present embodiment, the rod guide 6 is configured from the annular pipe holding member 13 fastened to the head cap 5 with bolts and coming in contact with the end portion of the cylinder 1, and in which the other end of the pipe 7 is fit, and the guide member 14 fastened to the pipe holding member 13 with bolts, having the outer diameter smaller than the pipe holding member 13, and supporting the outer periphery of the rod 2 by the inner periphery. Therefore, the guide member 14 that does not require the same strength as the pipe holding member 13 that adds the shaft force to the cylinder 1 can be manufactured from light material, and the liquid pressure device can be reduced in weight.

Further, in the liquid pressure device of the present embodiment, the guide member 14 includes the annular main body portion 14a fastened to the pipe holding member 13 with bolts, the socket 14b provided to the end portion of the main body portion 14a, inserted into the pipe holding member 13, and fit in the inner periphery of the cylinder 1 to position the cylinder 1 in the radial direction, and the annular bush 16 attached from the socket 14b to the inner periphery of the main body portion 14a to support the outer periphery of the rod 2. Therefore, the length of the main body portion 14a in the shaft direction can be made short, in addition to the function to position the cylinder 1 in the radial direction, and the entire length of the liquid pressure device excluding the rod 2 can be made short.

In the liquid pressure device of the present embodiment, the pipe holding member 13 includes the fitting hole 13c open from the tank T-side end and in which the other end of the pipe 7 is fit, and the leading hole 13d open from the side end opposite to the tank T and leading to the fitting hole 13c. Therefore, in assembly of the pipe holding member 13 to the head cap 5, a rod longer than the pipe 7 is inserted into the pipe 7, and the rod is inserted into the leading hole 13d, so that the pipe holding member 13 can be easily assembled to the head cap 5. The rod may just be pulled out and removed after the assembly of the pipe holding member 13 to the head cap 5.

Further, in the liquid pressure device of the present embodiment, the plug 20 is inserted into the leading hole 13d and blocks the leading hole 13d when the guide member 14 is fastened to the pipe holding member 13. Therefore, the inside of the pipe 7 can be maintained in a liquid-tight manner by the plug 20, and dropout of the plug 20 can be prevented.

Further, in the liquid pressure device of the present embodiment, the dust boot 21 stretched over the tip end of the rod 2 and the guide member 14 to cover the outer periphery of the rod 2 is included. The dust boot 21 is attached to the guide member 14 that forms a small-diameter portion in the rod guide 6. Therefore, even in the liquid pressure device like the actuator A provided with the first circuit block 22 that holds the solenoids 25c, 27c, and 29c near the outer tube 3 and the second circuit block 23 that holds the large motor M, the dust boot 21 does not interfere with the solenoids 25c, 27c, and 29c and the motor M. Therefore, the motor M and the solenoids 25c, 27c, and 29c can be arranged close to the outer tube 3, and the liquid pressure device can be downsized.

Then, in the liquid pressure device of the present embodiment, the piston 8 inserted into the cylinder 1 in a freely movable manner, and divides the inside of the cylinder 1 into the expansion-side chamber R1 and the contraction-side chamber R2 is included, and the pipe 7 communicates with the expansion-side chamber R1 through the rod guide 6 and communicates with the liquid pressure circuit C connected to the bottom cap 4 through the bottom cap 4. The heavy first circuit block 22 and second circuit block 23 in which the liquid pressure circuit C is provided are supported by the bottom cap 4, and thus an excessive load is not applied to the rod guide 6 that supports the rod 2, and smooth expansion/contraction operation is secured.

Further, in the liquid pressure device of the present embodiment, the piston passage 11 provided in the piston 8 and which allows only passage of a liquid from the contraction-side chamber R2 to the expansion-side chamber R1 and the valve case 9 that blocks the one end of the cylinder 1 and including the suction passage 12 that allows only passage of a liquid from the tank T to the contraction-side chamber R2. The liquid pressure circuit C includes the first bypass path Bp1 communicating with the contraction-side chamber R2 and communicating with the expansion-side chamber R1 through the pipe 7, the first on-off valve 25 provided in the middle of the first bypass path Bp1, the second bypass path Bp2 that allows the contraction-side chamber R2 and the tank T to communicate with each other, the second on-off valve 27 provided in the middle of the second bypass path Bp2, and the pump 32 that supplies the liquid from the tank T to the expansion-side chamber R1 through the pipe 7. Therefore, the liquid pressure device can function as the actuator A and also the passive damper. Further, in this case, the liquid pressure device can function as not only the actuator but also the passive damper only by opening/closing of the first on-off valve 25 and the second on-off valve 27, and does not involve a troublesome and steep switching operation of the valves. Therefore, a highly responsive and reliable system can be provided. The supply of the hydraulic oil from the pump 32 and the flow of the hydraulic oil by the expansion/contraction operation in the liquid pressure device pass through the expansion-side chamber R1 and the contraction-side chamber R2 in order and are finally returned to the tank T. Therefore, even if a gas is mixed in the expansion-side chamber R1 or the contraction-side chamber R2, the gas is autonomously discharged to the tank T by the expansion/contraction operation of the actuator A. Therefore, the actuator A can prevent deterioration of responsiveness of generation of thrust.

Further, in the liquid pressure device of the present embodiment, the liquid pressure circuit C further includes the discharge passage Ep that connects the expansion-side chamber R1 communicating through the pipe 7 to the tank T, and the variable relief valve 29 provided in the middle of the discharge passage Ep and can change the valve opening pressure. Therefore, when the actuator A as a liquid pressure device is caused to perform the expansion/contraction operation, the pressure in the expansion-side chamber R1 is adjusted to the valve opening pressure of the variable relief valve 29, and the pressure in the expansion-side chamber R1 can be easily controlled by adjustment of the valve opening pressure of the variable relief valve 29. By providing the discharge passage Ep and the variable relief valve 29 in this way, the thrust of the actuator A can be sensorlessly controlled. Further, the pressure in the expansion-side chamber R1 may just be controlled by the variable relief valve 29, and thus the motor M may just drive the pump 32 at a constant number of rotation, and it is not necessary to highly accurately control the motor M to adjust the discharge flow rate of the pump 32. Further, it is also not necessary to open/close the first on-off valve 25 and the second on-off valve 27 at a high speed to control the thrust the actuator A, and also not necessary to control the thrust, using the first on-off valve 25 and the second on-off valve 27 as the variable relief valve with an opening/closing function. Therefore, the actuator A as a liquid pressure device becomes inexpensive, and a robust system in hardware and in software can be constructed.

In the above-description, the liquid pressure device of the present invention has been described using the example in which the liquid pressure device of the present invention is embodied to the actuator A. However, the present invention can be applied to a liquid pressure device that employs a structure that accommodates a pipe in a tank to detour an inside of a cylinder to cause an expansion-side chamber and a contraction-side chamber to communicate with each other. Therefore, the present invention can be applied to a liquid pressure device such as a uniflow damper or a damper used for semi-active control, in addition to the actuator. Further, the liquid pressure device can be used for various uses such as vibration control of architectural structures and machines, and vibration control of vehicles, in addition to the vibration control of the railway vehicle.

The description about the embodiment of the present invention is completed. It is obvious that the scope of the present invention is not limited to the illustrated or described details.

REFERENCE SIGNS LIST

1 Cylinder
2 Rod
3 Outer tube
4 Bottom cap
5 Head cap
6 Rod guide
7 Pipe
8 Piston
9 Valve case
11 Piston passage
12 Suction passage
13 Pipe holding member
13c Fitting hole
13d Leading hole
14 Guide member
14a Main body portion
14b Socket
16 Bush
20 Plug
21 Dust boot
25 First on-off valve
27 Second on-off valve
29 Variable relief valve
30 Pump
A Actuator as liquid pressure device
Bp1 First bypass path
Bp2 Second bypass path
C Liquid pressure circuit
Ep Discharge passage
R1 Expansion-side chamber
R2 Contraction-side chamber
T Tank

The invention claimed is:
1. A liquid pressure device comprising:
a cylinder;
a rod to be inserted into the cylinder in a freely movable manner;
an outer tube that accommodates the cylinder inside the outer tube;
a tank formed between the cylinder and the outer tube;
a bottom cap connected to a first end of the outer tube;
an annular head cap connected to a second end of the outer tube;

an annular rod guide connected to the head cap, and which guides movement of the rod when the rod is inserted into an inside of the rod guide; and a pipe forming a passage accommodated in the tank, sandwiched by the bottom cap and the rod guide, and isolated from the tank, wherein the cylinder is sandwiched by the bottom cap and the rod guide, wherein a first end of the pipe is fit in the bottom cap, and wherein the rod guide includes an annular pipe holding member fastened to the head cap with a first bolt, coming in contact with a first end portion of the cylinder, wherein a second end of the pipe is fit in the pipe holding member, and a guide member fastened to the pipe holding member with a second bolt, having an annular shape with an outer diameter smaller than the pipe holding member, and which supports an outer periphery of the rod with an inner periphery.

2. The liquid pressure device according to claim 1, wherein the guide member includes an annular main body portion fastened to the pipe holding member with the second bolt, a socket provided to an end portion of the main body portion, inserted into the pipe holding member, and fit in an inner periphery of the cylinder to position the cylinder in a radial direction, and an annular bush attached from the socket to an inner periphery of the main body portion to support the outer periphery of the rod.

3. The liquid pressure device according to claim 2, wherein the pipe holding member is provided with a fitting hole open from a tank-side end, and in which the second end of the pipe is fit, and a leading hole open from a side end opposite to the tank, and leading to the fitting hole.

4. The liquid pressure device according to claim 3, comprising:

a plug to be inserted into the leading hole provided in the pipe holding member, wherein the guide member blocks the leading hole when fastened to the pipe holding member.

5. The liquid pressure device according to claim 2, comprising:

a dust boot stretched over a tip end of the rod and the guide member to cover the outer periphery of the rod.

6. The liquid pressure device according to claim 2, comprising:

a piston inserted in the cylinder in a freely movable manner, and which divides an inside of the cylinder into an expansion-side chamber and a contraction-side chamber, wherein the pipe communicates with the expansion-side chamber through the rod guide, and communicates with a liquid pressure circuit connected to the bottom cap through the bottom cap.

7. The liquid pressure device according to claim 6, comprising:

a piston passage provided in the piston, and allowing only passage of a liquid from the contraction-side chamber to the expansion-side chamber; and a valve case that blocks a second end portion of the cylinder and includes a suction passage allowing only passage of a liquid from the tank to the contraction-side chamber, wherein the liquid pressure circuit includes a first bypass path communicating with the contraction-side chamber and communicating with the expansion-side chamber through the pipe, a first on-off valve provided in a middle of the first bypass path, a second bypass path allowing the contraction-side chamber and the tank to communicate with each other, a second on-off valve provided in a middle of the second bypass path, and a pump that supplies a liquid from the tank to the expansion-side chamber through the pipe.

8. The liquid pressure device according to claim 7, wherein the liquid pressure circuit further includes a discharge passage connecting the expansion-side chamber communicating through the pipe to the tank, and a variable relief valve provided in a middle of the discharge passage and capable of changing valve opening pressure.

9. The liquid pressure device according to claim 1, wherein the pipe holding member is provided with a fitting hole open from a tank-side end, and in which the second end of the pipe is fit, and a leading hole open from a side end opposite to the tank, and leading to the fitting hole.

10. The liquid pressure device according to claim 9, comprising:

a plug to be inserted into the leading hole provided in the pipe holding member, wherein the guide member blocks the leading hole when fastened to the pipe holding member.

11. The liquid pressure device according to claim 1, comprising:

a dust boot stretched over a tip end of the rod and the guide member to cover the outer periphery of the rod.

12. The liquid pressure device according to claim 1, comprising:

a piston inserted in the cylinder in a freely movable manner, and which divides an inside of the cylinder into an expansion-side chamber and a contraction-side chamber, wherein the pipe communicates with the expansion-side chamber through the rod guide, and communicates with a liquid pressure circuit connected to the bottom cap through the bottom cap.

13. The liquid pressure device according to claim 12, comprising:

a piston passage provided in the piston, and allowing only passage of a liquid from the contraction-side chamber to the expansion-side chamber; and a valve case that blocks a second end portion of the cylinder and includes a suction passage allowing only passage of a liquid from the tank to the contraction-side chamber, wherein the liquid pressure circuit includes a first bypass path communicating with the contraction-side chamber and communicating with the expansion-side chamber through the pipe, a first on-off valve provided in a middle of the first bypass path, a second bypass path allowing the contraction-side chamber and the tank to communicate with each other, a second on-off valve provided in a middle of the second bypass path, and a pump that supplies a liquid from the tank to the expansion-side chamber through the pipe.

14. The liquid pressure device according to claim 13, wherein the liquid pressure circuit further includes a discharge passage connecting the expansion-side chamber communicating through the pipe to the tank, and a variable relief valve provided in a middle of the discharge passage and capable of changing valve opening pressure.

15. The liquid pressure device according to claim 1, comprising:

a piston inserted in the cylinder in a freely movable manner, and which divides an inside of the cylinder into an expansion-side chamber and a contraction-side chamber, wherein the pipe communicates with the expansion-side chamber through the rod guide, and communicates with a liquid pressure circuit connected to the bottom cap through the bottom cap.

16. The liquid pressure device according to claim 15, comprising:

a piston passage provided in the piston, and allowing only passage of a liquid from the contraction-side chamber to the expansion-side chamber; and a valve case that blocks a second end portion of the cylinder and includes a suction passage allowing only passage of a liquid from the tank to the contraction-side chamber, wherein the liquid pressure circuit includes a first bypass path communicating with the contraction-side chamber and communicating with the expansion-side chamber through the pipe, a first on-off valve provided in a middle of the first bypass path, a second bypass path allowing the contraction-side chamber and the tank to communicate with each other, a second on-off valve provided in a middle of the second bypass path, and a pump that supplies a liquid from the tank to the expansion-side chamber through the pipe.

17. The liquid pressure device according to claim 16, wherein the liquid pressure circuit further includes a discharge passage connecting the expansion-side chamber communicating through the pipe to the tank, and a variable relief valve provided in a middle of the discharge passage and capable of changing valve opening pressure.

18. The liquid pressure device according to claim 1, wherein the head cap is connected to the outer tube on a first side of the head cap, and the pipe holding member is fastened to the head cap on a second side of the head cap opposite the first side.

* * * * *